US011808399B2

(12) United States Patent
Vilhelmsen

(10) Patent No.: US 11,808,399 B2
(45) Date of Patent: Nov. 7, 2023

(54) SLIDING TRACK CONNECTOR

(71) Applicant: Kurt Vilhelmsen, Buckley, WA (US)

(72) Inventor: Kurt Vilhelmsen, Buckley, WA (US)

(*) Notice: Subject to any disclaimer, the term of this patent is extended or adjusted under 35 U.S.C. 154(b) by 340 days.

(21) Appl. No.: 17/329,879

(22) Filed: May 25, 2021

(65) Prior Publication Data

US 2021/0388938 A1 Dec. 16, 2021

Related U.S. Application Data

(60) Provisional application No. 63/038,356, filed on Jun. 12, 2020.

(51) Int. Cl.
*F16M 11/04* (2006.01)
*F16B 33/00* (2006.01)

(52) U.S. Cl.
CPC .......... *F16M 11/043* (2013.01); *F16B 33/002* (2013.01)

(58) Field of Classification Search
CPC . A47B 96/14; A47B 96/1425; A47B 96/1441; A47B 96/145; A47B 96/1458; A47B 96/1466; A47B 96/1475; A47B 96/1483; F16B 2/14; F16B 33/002; F16M 11/043; F16M 13/022
USPC ...... 211/162; 248/65, 220.21, 224.7, 295.11, 248/297.11, 298.1
See application file for complete search history.

(56) References Cited

U.S. PATENT DOCUMENTS

| 3,486,726 | A | * | 12/1969 | Kindorf | F16L 3/243 248/228.2 |
| 4,025,017 | A | * | 5/1977 | Miller | G12B 9/08 248/297.11 |
| 4,046,344 | A | * | 9/1977 | Scanlan | F16L 3/245 403/387 |
| 4,391,376 | A | * | 7/1983 | Finnegan | A63C 11/028 29/451 |
| 4,524,937 | A | * | 6/1985 | Zizan | F16L 3/243 248/62 |
| 4,662,590 | A | * | 5/1987 | Hungerford, Jr. | F16B 37/045 403/353 |
| 5,924,260 | A | * | 7/1999 | Austin | E04B 1/4107 52/698 |

(Continued)

OTHER PUBLICATIONS

ICW—MD Track Installation (icwusa.com) Brochure, pp. 1-2 (Downloaded—Sep. 23, 2021).

(Continued)

*Primary Examiner* — Joshua E Rodden
(74) *Attorney, Agent, or Firm* — Dean A. Craine, P.S.

(57) ABSTRACT

A sliding track connector for mounting objects to a track member using a twist or zip ties. The connector includes a body with a bottom surface, outer sidewalls, a center void, and a plurality of transversely aligned holes. In one embodiment, a post extends downward from the body's bottom surface and slides freely inside the slot formed on the track member. Attached to the post is a wide cap that, when twisted, presses against the inside surfaces of the flanges formed on opposite sides of the slot. In one embodiment, the post and cap are integrally formed on the body so that when the body is rotated, the post rotates inside the channel, and the cap becomes wedged against the flanges on opposite sides of the slot. One or two twist ties are inserted through the holes on the body to hold an object on the track member.

13 Claims, 9 Drawing Sheets

(56) References Cited

U.S. PATENT DOCUMENTS

| | | | | |
|---|---|---|---|---|
| 6,769,847 B1* | 8/2004 | Heilmann | | B60P 7/0807 |
| | | | | 410/104 |
| 6,827,531 B2* | 12/2004 | Womack | | B60P 7/0815 |
| | | | | 410/104 |
| 7,913,957 B2* | 3/2011 | Nelson | | F16L 3/2431 |
| | | | | 248/65 |
| 8,561,820 B2* | 10/2013 | Kitt | | A61G 12/001 |
| | | | | 211/187 |
| 9,103,365 B2* | 8/2015 | Whipple | | F16B 37/045 |
| 9,303,792 B2* | 4/2016 | Heims | | F16L 3/243 |
| 9,539,721 B1* | 1/2017 | Kao | | B25H 3/003 |
| 10,130,178 B1* | 11/2018 | Landes | | A47B 57/54 |
| 10,520,113 B1* | 12/2019 | Thompson | | F16L 3/22 |
| 10,758,065 B2* | 9/2020 | Penalver, Jr. | | A47B 96/1441 |
| 2006/0131812 A1* | 6/2006 | Caruso | | A63B 63/004 |
| | | | | 273/407 |
| 2014/0061412 A1* | 3/2014 | Suzuki | | F16B 37/02 |
| | | | | 248/226.11 |
| 2014/0259566 A1* | 9/2014 | Rouleau | | F16L 3/243 |
| | | | | 24/457 |

OTHER PUBLICATIONS

JACO—EVO Wall Arm—Instruction Manual—pp. 1-2 (Downloaded—Sep. 23, 2021).

* cited by examiner

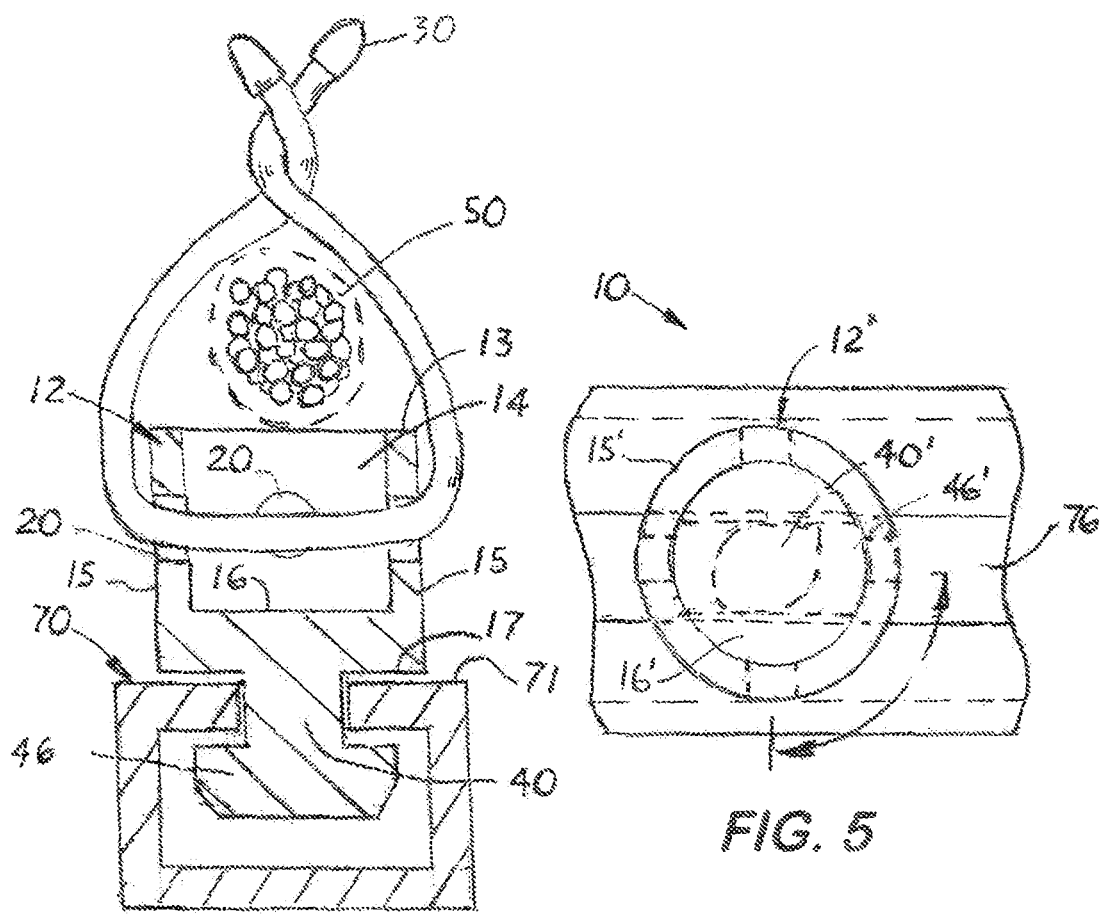
FIG. 3
FIG. 5
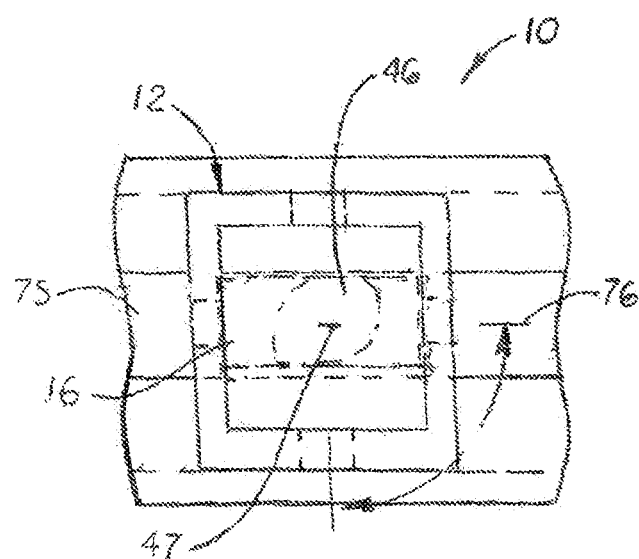
FIG. 4

SLIDING TRACK CONNECTOR

This utility patent application is based on and claims the filing date benefit of U.S. provisional patent application (Application No. 63/038,356) filed on Jun. 12, 2020.

The following patent document contains original material subject to copyright protection. The copyright owner has no objection to the facsimile or digital download reproduction of all or part of the patent document but otherwise reserves all copyrights.

BACKGROUND OF THE INVENTION

1. Field of the Invention

This invention pertains to organizers that easily mount at different locations to a track member with a longitudinally aligned slot that communicates with an inner channel formed in the track member allowing objects to be attached to different locations on the track member.

2. Description of the Related Art

U.S. Pat. No. 9,620,293 teaches a substrate surface mounted multiple cable or wire organizer that includes a rigid body with a center bore formed and a plurality of transversely aligned holes that extend through the body's sidewalls. Holes on one side of the connector body are axially aligned with holes formed on the opposite side of the body. The body has a flat bottom that attaches to a flat surface using either a threaded connector or adhesive tape. A twist tie may be extended through axially aligned holes formed on the body so that ends of the twist tie may be twisted together to hold cables, wires or other objects to the flat surface.

Today, elongated, hollow track members are commonly used in businesses and homes. For example, the cubical-like workspaces used in offices and the structural members used in residential greenhouses are made of track members. The track members are rigid tubes square or rectangular in cross-section. Formed on one side of the track member is a continuous, axially aligned slot that provides access to a channel formed inside the track member. The slot is centrally aligned on one side of the track member and surrounded by two flat flanges. During assembly, a threaded bolt with a wide head may be placed inside the channel. The bolt is perpendicularly aligned with the track member's axis, and the bolt's threaded shaft extends through the slot. The bolt head is located inside the channel and presses against the inside surfaces of the two flanges. A structure member is attached to the exposed portion of the threaded shaft, and a nut is attached to the end of the threaded shaft. The nut is then tightened to connect the structural member to the track member.

What is needed is a sliding track connector that may be used with twist or zip ties that engages the slot formed on a track member that can be selectively locked in a fixed position to the track member by manually rotating the sliding track connector.

SUMMARY OF THE INVENTION

Disclosed is a sliding track connector similar to the wire organizer shown in U.S. Pat. No. 9,620,293 and incorporated by reference herein. The sliding track connector is designed to slide over the surface of a hollow track member with a longitudinally aligned slot. The sliding track connector includes a cubed-shaped or cylindrical-shaped body with a flat bottom surface. The body comprises multiple flat sidewalls or a continuous curved sidewall aligned perpendicularly to the body's bottom surface. Formed in the body is a coaxially aligned center void. At least one pair of side holes extend transversely through the sidewalls of the body and communicate with the center void. In one embodiment, one or more pairs of side holes are axially aligned so that a twist tie or zip tie may easily pass through them.

In one embodiment, a post extends perpendicularly from the bottom surface of the body. The post is configured to slide in the slot formed in the track member.

Formed on the distal end of the post is a square or rectangular or oblong cap. A gap is formed between the cap and the bottom surface of the body. The gap is approximately the same size as the thickness of the flanges surrounding the slot. The cap, which may be manufactured in different shapes and sizes, is configured to slide inside the channel formed in the track member as the body slides over the outside surface. In one embodiment, the cap is rectangular or oblong with a narrow width that allows the user to insert the cap directly into the slot at the desired location along the track member. When the user axially rotates the body 90 degrees, the shape of the cap is configured so that the end sections of the cap extend under the flanges on opposite sides of the slot. In the embodiment shown herein, the gap between the top of the cap and the bottom surface of the body is sufficiently small so that the end sections of the cap are wedged tightly against the inside surfaces of the flanges to hold the body in a fixed location on the track member.

In one embodiment, the body, the post, and the cap are integrally formed. In another embodiment, the cap and post are integrally formed and create a single structure selectively attached to the body during use. The body includes a centrally aligned post bore configured to receive the post. During assembly, the combination cap and post structure is positioned below the bottom surface of the body, and the post is then inserted into the post bore. The combination cap and post structure is then aligned so that the post slides into the slot and the cap slides freely in the track member's channel. When positioned at the desired location on the track member, the cap is then rotated so the end sections of the cap are positioned under the flanges adjacent to the slot. A screw is provided that draws the post into the post bore and forces the end sections of the cap against the flanges.

In still another embodiment, the post is eliminated so that the middle section of the screw acts as the post. The tip of the screw extends downward from the body and penetrates the cap. When the screw is tightened, the cap is drawn inward towards the inside surface of the flanges on the track member to hold the connector on the track member securely.

During use, the connector's body may be positioned at different locations of the track member. In one embodiment that uses a rectangular or oblong cap attached to the post, the body is aligned over the desired location on the track member so that the cap drops into the slot. The body is then manually rotated 90 degrees forcing the cap under the two flanges to lock the body in a fixed position on the track member. A twist tie, a zip tie, or a book may then be extended through at least one side hole to attach an object from the track member.

DESCRIPTION OF THE DRAWINGS

FIG. 3 is a sectional, side elevational view of the sliding track connector attached to the track member shown in FIGS. 1 and 2.

FIG. 4 is a top plan view of a sliding track connector that includes the cubed-shaped body shown in FIG. 1 twisted 90 degrees on the track member, thereby forcing the end sections of the cap under the flanges adjacent to the slot to lock the sliding track connector onto the track member.

FIG. 5 is a top plan view of another embodiment of the sliding track connector that uses a cylindrical body attached to the track member.

DESCRIPTION OF THE PREFERRED EMBODIMENT(S)

Figure 1:
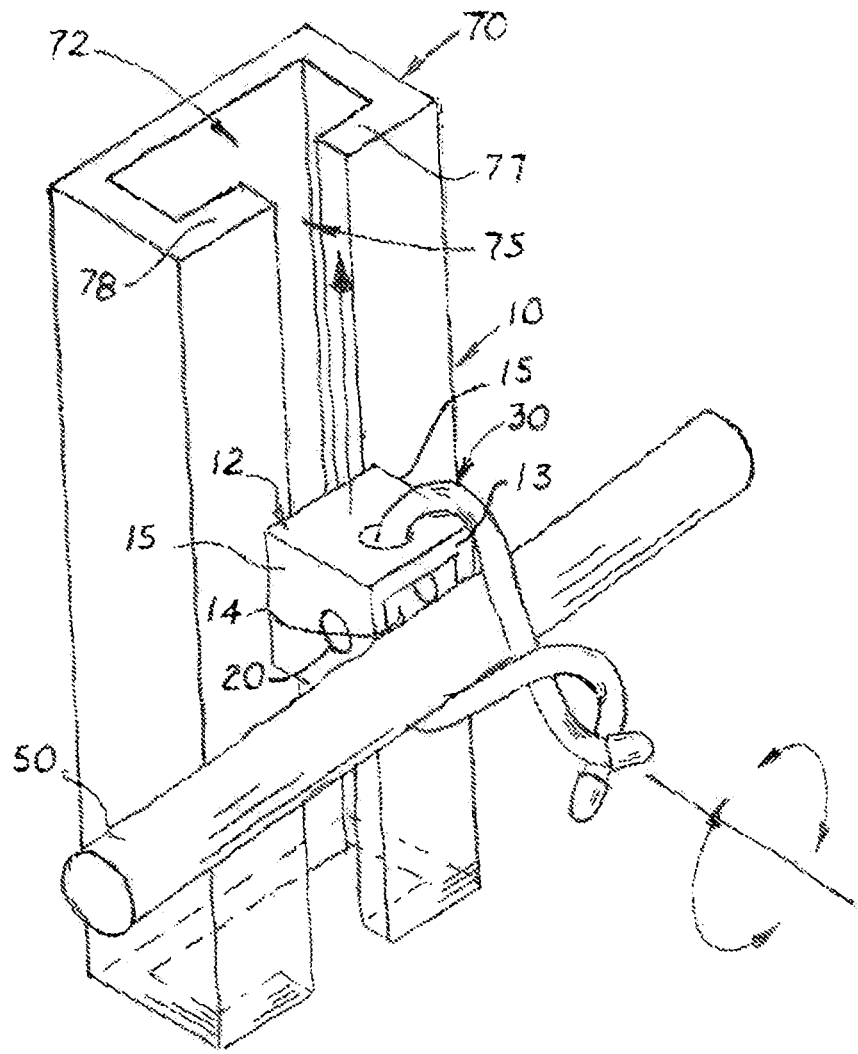
FIG. 1 is a perspective view of a section of track member with an inner channel and an axially aligned slot formed on one side of the track member surrounded by two flanges, and a sliding track connector that includes a cubed-shaped body securely attached to the track member and showing with a cable extending over the top surface of the body and affixed to the body by a twist tie.
Figure 2:
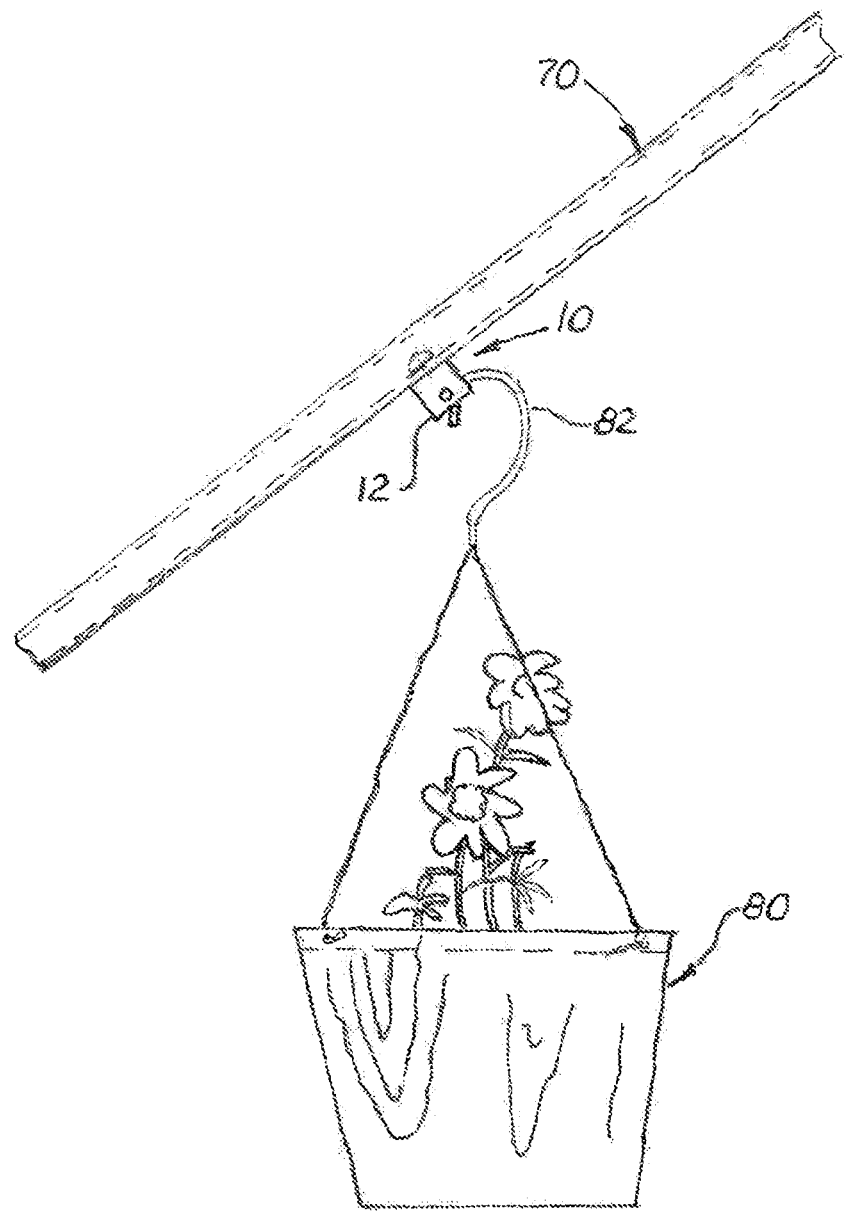
FIG. 2 is a side elevational view of a track member commonly used in a greenhouse with a sliding track connector attached to the track member and used to hold a hanging flower pot.
Figure 6:
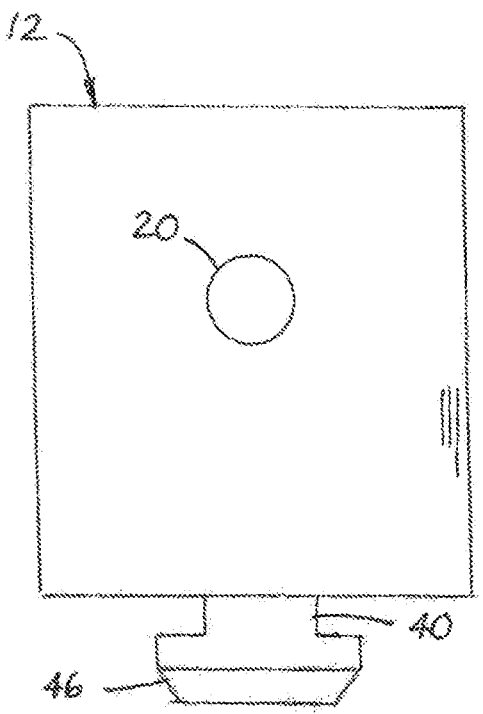
FIGS. 6-9 are front elevational, side elevational, top plan, and bottom plan views of a track connector, respectively, that includes the cubical body shown in FIGS. 1, 3, and 4.
Figure 7:
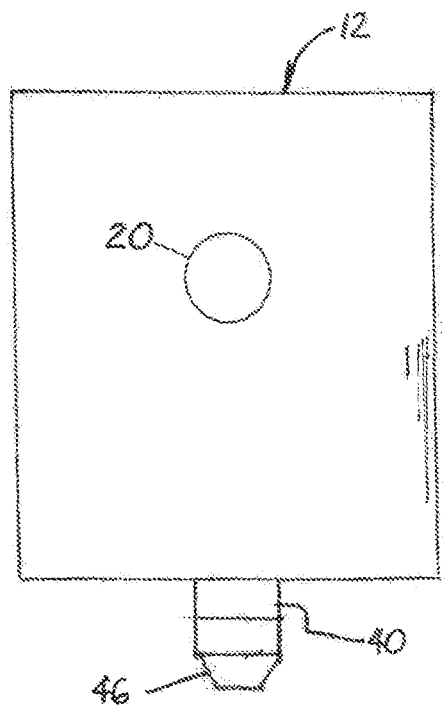
Figure 8:
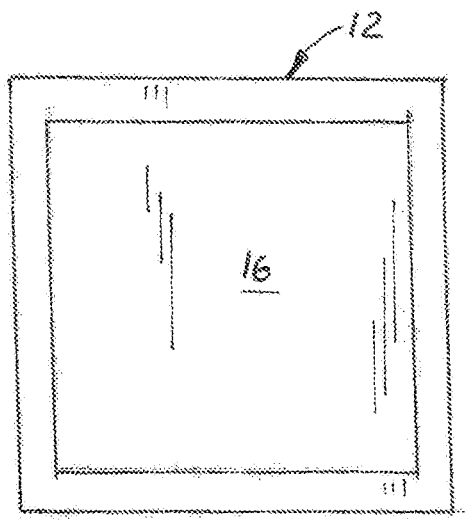
Figure 9:
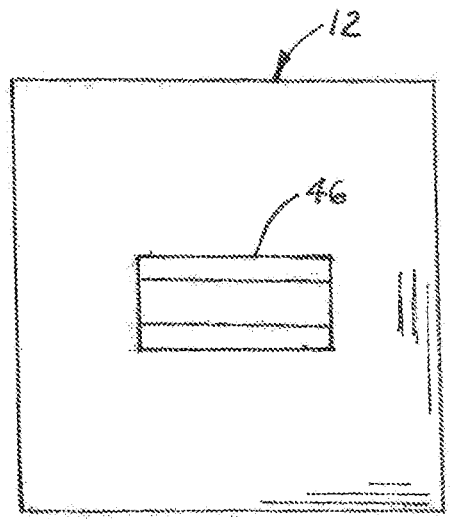

Referring to the Figs, a sliding track connector 10 includes a cubical or cylindrical body 12, 12', respectively, with a plurality of transversely aligned holes 20 configured to receive a twist tie 30, or similar structure, capable of extending transversely over the body 12, 12'.

Each body 12, 12' includes a flat bottom surface 17 configured to rest against the outside surface 71 of an elongated track member 70. The cubical body 12, shown in FIGS. 1, 3, 4, and 12 include four perpendicular flat sidewalls 15 a top edge surface 13, and a recessed center void 14 formed between the sidewalls 15. Formed inside the center void 14 is a flat inside surface 16. In the embodiment shown, the cubical body 12 measures approximately 1×1×1 inch, and the sidewalls 15 and bottom surface 17 are approximately ⅛ to 3/16 inches thick. The holes 20 formed on the sidewalls 15 are approximately ⅛ to ¼ inches wide.

Formed or attached to the bottom surface 17 of the cubical body 12 is a perpendicularly aligned post 40. The post 40 may be round in cross-section, oblong, and slightly smaller in width than the slot 75 formed on the track member 70.

Formed or attached to the distal end of the post 40 is a cap 46. Cap 46 is perpendicular to axis 41 of post 40. In one embodiment, cap 46 is configured to fit into the slot 75 formed on a track member 70. In this embodiment, cap 46 is an elongated structure with a long axis 47. When the long axis 47 of cap 46 is aligned with the slot's long axis 76, cap 46 may be inserted into slot 75. When body 12 is rotated, cap 46 also rotates inside channel 72. The opposite ends of cap 46 become wedged against the flanges on the track member 70 on opposite sides of slot 75 to securely hold the body 12 in place on track member 70.

FIGS. 6-9 are front elevational, side elevational, top plan, and bottom plan views, respectively, of the cubed-shaped body 12 shown in FIGS. 1-4.

FIG. 5 is a top plan view of another embodiment of the sliding track connector 10 that uses a cylindrical body 12'. The body 12' includes a continuous curved sidewall 14' that surrounds a recessed center void 14'. Formed inside the center void 14' is a flat bottom wall 16'. In the embodiment shown, the body 12' measures approximately 1×1×1 inch, and the curved sidewall 15' and bottom wall 16' are approximately ⅛ to 3/16 inches thick. The holes 20' formed on the sidewall 15' are approximately ⅛ to ¼ inches wide. Formed or integrally formed on the body 12' is a post 40' and cap 46'.

Figure 10:
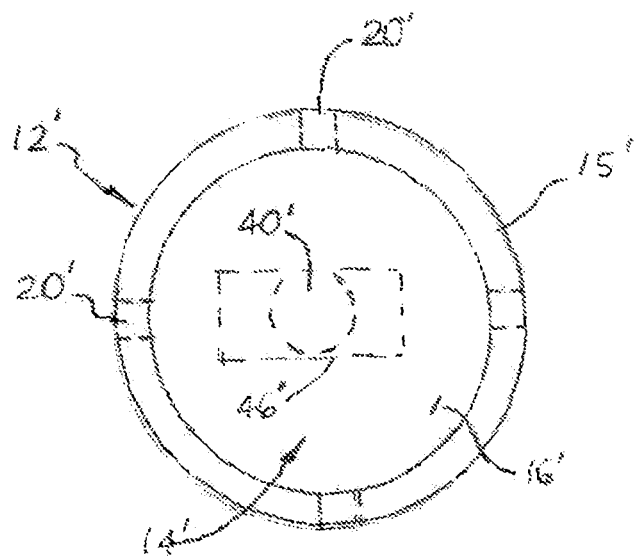
FIGS. 10 and 11 are top plan and bottom plan views, respectively, of the sliding track connector, shown in FIG. 5.
Figure 11:
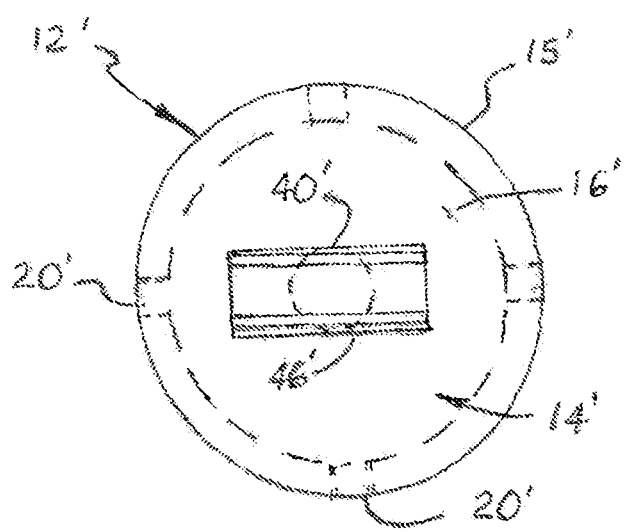

FIGS. 10 and 11 are top plan and bottom plan views of body 12' shown in FIG. 5 showing the relative size and shape of the post 40' and cap 46'. Post 40' is circular and the cap 46' is rectangular in cross-section.

Figure 12:
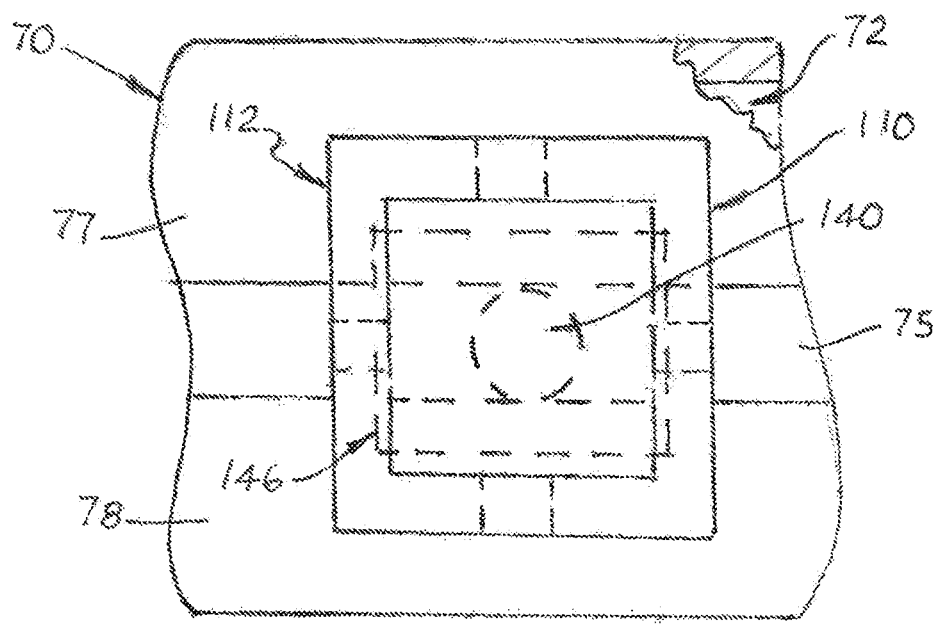
FIG. 12 is a top plan view of a sliding track connector with a cubical or cylindrical body aligned over a slotted track member with a square or rectangular-shaped cap configured to extend under the flanges adjacent the slot.

The embodiment shown in FIGS. 1-11 are all designed to 'drop into' the slot 75. FIG. 12 is a top plan view of a sliding track connector 110 designed to attach to track member 70 by entering an open-end (not shown) of the track member 70. The sliding track connector 110 includes a cubical body 112 with a post 140, designed to slide freely along slot 75. Attached or formed on the distal end of the post 140 is a square or rectangular cap 146. The cap 146 has a sufficient width to extend under the flanges 77, 78 adjacent to slot 75.

Figure 13:
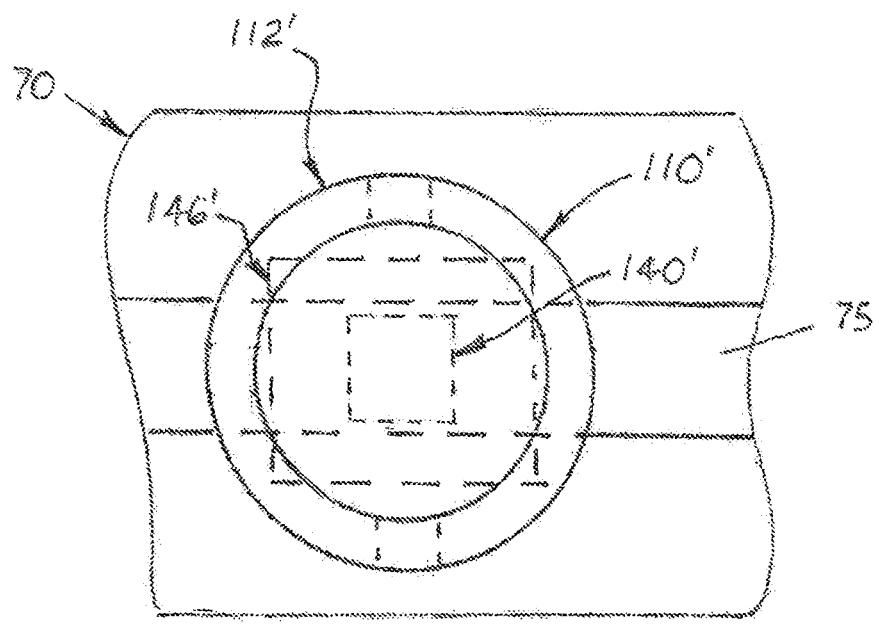
FIG. 13 is a top plan view of a sliding track connector with a cylindrical body with a square or rectangular-shaped cap configured to extend under the flanges adjacent to the slot.

FIG. 13 is a top plan view of a sliding track connector 110' with a cylindrical body 112' with a square or rectangular-shaped cap attached to the distal end of a post 140 square in cross-section and configured to slide freely in slot 75, extend under the flanges adjacent to the slot. Attached or formed on the distal end of the post 140' is a square or rectangular cap 146' also configured to extend under the flanges 77, 78 adjacent to slot 75.

Figure 14:
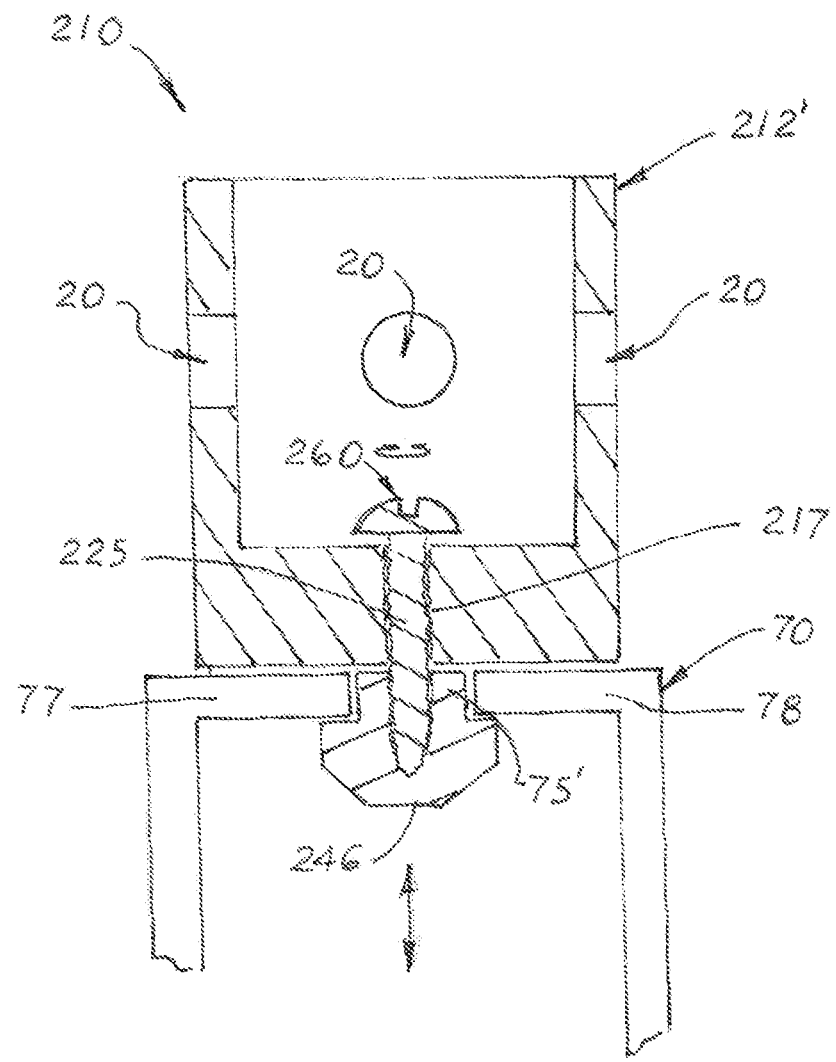
FIG. 14 is a sectional, side elevational view of another embodiment of the sliding track connector that includes a cubical or cylindrical body with a center bore and uses a cap with a perpendicularly aligned post that partially extends and slides into the slot formed in the track member and into the central bore and uses a threaded screw that extends downward from the center bore to draw the post inward towards the body to force the cap inward against the inside surface of the track member.

FIG. 14 is a sectional side elevational view of another embodiment of the sliding track connector 210 that uses either a cubed-shaped or cylindrical body 212' (shown) with a center post bore 217 formed on the bottom plate 225. Inserted into the post bore 217 is a threaded connector 260. During assembly, a cap 246 is attached to the distal end of the threaded connector 260. The cap 246 includes an optional short post 248 the fits into and slides along the slot 75 formed in the track member 70. When the threaded connector 260 is tightened, it extends into the post 248 and draws the cap 246 upward and against the inside surface of the flanges 77, 78 on the track member 70.

Figure 15:
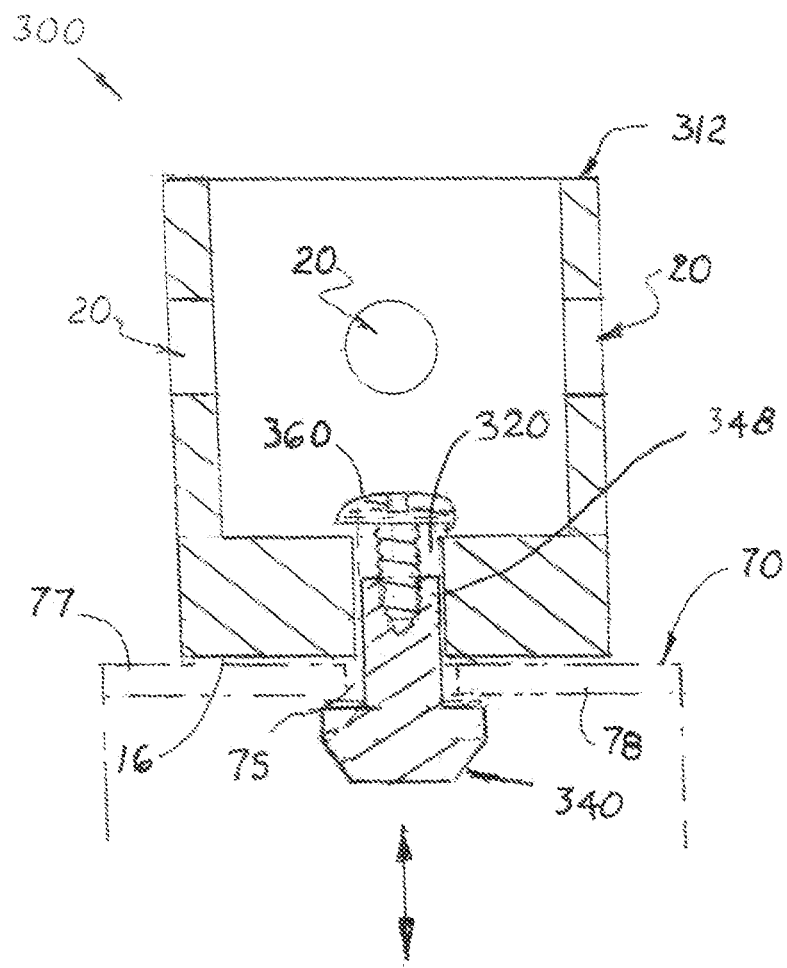
FIG. 15 is a sectional, side elevational view of another embodiment of the track connector that includes a cubical or cylindrical body that uses a cap with an optional neck that fits into the slot formed in the track member and uses a threaded screw that extends downward from the body to draw the cap inward towards the body to hold the connector on the track member securely.

FIG. 15 is a sectional side elevational view of another embodiment of the sliding track connector 300 that uses a cubical or cylindrical body 312 and a cap 340 with an optional neck 348 that fits into the slot 75 formed in the track member 70. A threaded screw 360 extends downward through a post bore 320 formed on the body 312, that when tightened, draws cap 340 inward towards the body 312 to hold the sliding track connector 300 on the track member 70 securely.

Figure 16:
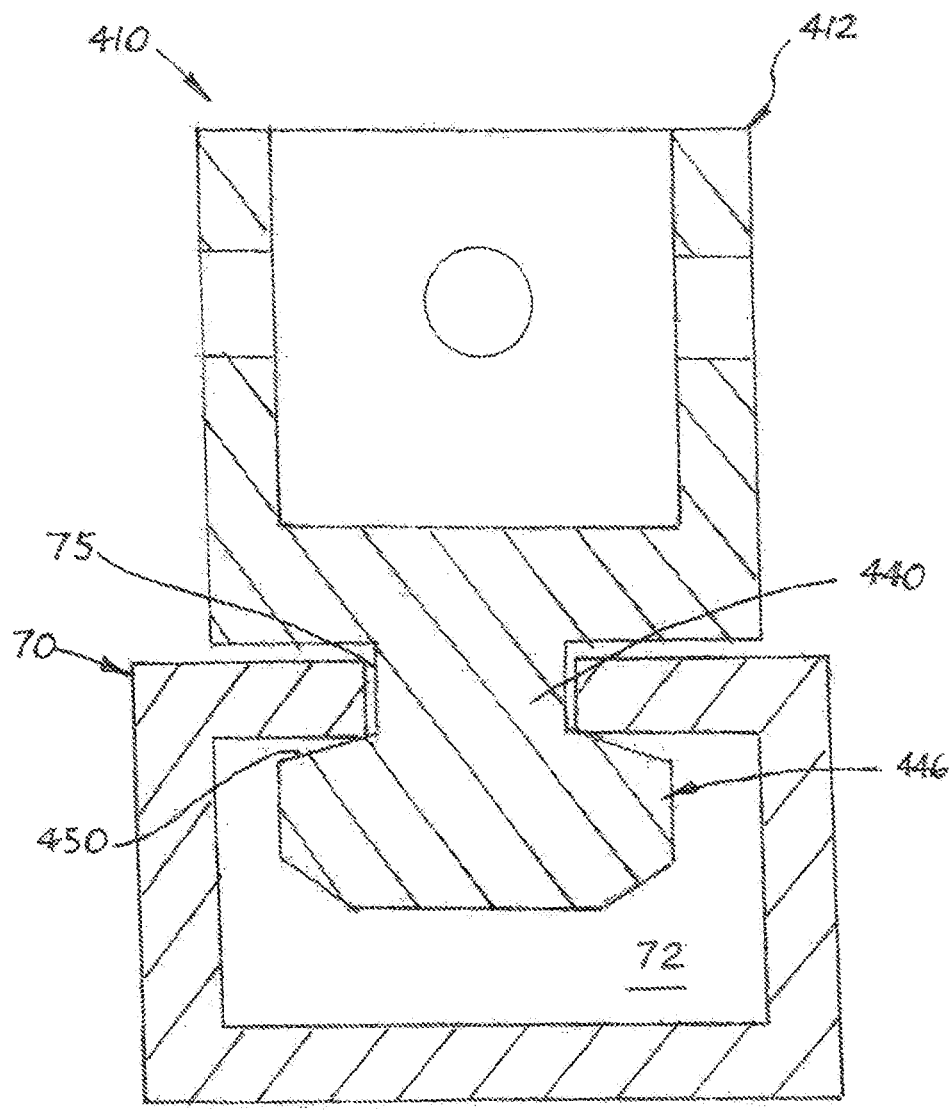
FIG. 16 is a sectional, side elevational view of another embodiment of the sliding track connector that includes a cubical or cylindrical body with an integrally formed post and cap with the top surface of the cap beveled downward to lock the body on the track member.

FIG. 16 is a sectional, side elevational view of a 'slide on style' cubical sliding track connector 410 that uses a cubical or cylindrical body 412, a square or rectangular cap 446 attached to a post 440. The post 440 is designed to slide along slot 75, and cap 146 is designed to slide inside channel 72. The top surface 450 of cap 446 is beveled downward to lock the connector 410 on the track member 70 when rotated.

During use, the bodies 12, 12', 112, 112', 212, 312 or 412 are securely attached to a track member 70. A pair of holes 20 on opposite sides of each body are identified, and a twist tie 30 is inserted therethrough, so its opposite ends extend outward from the body approximately the same distance. An object to be attached to the sliding track connector is then extended over the top surface of the body. The ends of the twist ties 30 are then twisted together to hold the object over the top surface. If desired, a second twist tie 30 may extend through the other pair of holes to attach additional objects to the body.

Using one of the above described sliding track connectors for attaching objects to a track member with a longitudinally aligned slot and an inner channel, a method for attaching objects to a track member is described comprising the following steps:
 a. selecting a sliding track connector that includes a body with a center void surrounded by four straight sidewalls or a single curved sidewall, a flat bottom surface, and at least one pair of axially aligned holes formed on the sidewalls or sidewall formed on opposite sides of the body, a cap located below the body configured to slide along the inner channel formed inside the track member and means for selectively pressing the cap against the flanges on opposite sides of the slot thereby attaching the body in a fixed position on the track member;
 b. sliding the body along the slot to a desired location over the outside surface of the track member;
 c. adjusting the means for tightening the cap against the inside surface of the flanges of the track member on opposite sides of the slot to affix the body on the track member;
 d. selecting at least one twist tie through two holes formed the opposite sides of the body, said twist tie being sufficient in length so that the ends of the twist tie may extend over the top surface of the body and twisted together to hold an object over the body;
 e. extending an object over the body; and
 f. twisting the exposed ends of the twist tie together to hold the object over the body.

In compliance with the statute, the invention described has been described in language more or less specific as to structural features. However, it should be understood that the invention is not limited to the specific features shown since the means and construction shown comprises the preferred embodiments for putting the invention into effect. Therefore, the invention is claimed in its forms or modifications within the legitimate and valid scope of the amended claims, appropriately interpreted under the doctrine of equivalents.

I claim:

1. A sliding track connector for attaching objects to a track member with an inner channel and an axial slot formed on one surface that communicates with said inner channel and is surrounded by two flanges, said sliding track connector, comprising:
 a. a body with a bottom surface and perpendicularly aligned straight sidewalls or a continuous curved sidewall, a center void formed inside the body, and at least two pairs of transversely aligned holes formed on said sidewalls or said curved sidewall configured to receive a twist tie;
 b. a cap located below said body and configured to slide inside said inner channel formed in said track member, said cap configured to be selectively rotated or drawn towards said body and press against said flanges on opposite sides of said slot on said track member to hold the said body in a fixed location on said track member; and
 c. a post extending between said body and said cap and configured to slide along said slot.

2. The sliding track connector, as recited in claim 1, wherein said post affixed and extends upward from said cap.

3. The sliding track connector, as recited in claim 1, wherein said post and said cap are integrally formed.

4. The sliding track connector, as recited in claim 1, wherein said post is circular in cross-section.

5. The sliding track connector, as recited in claim 3, wherein said post is circular in cross-section.

6. The sliding track connector, as recited in claim 1, wherein said cap is rectangular.

7. The sliding track connector, as recited in claim 2, wherein said cap is rectangular.

8. The sliding track connector, as recited in claim 4, wherein said cap is rectangular.

9. The sliding track connector, as recited in claim 1, wherein said post is a threaded connector extending between said body and said cap so that when said threaded connector is rotated and selectively draw said cap towards said body.

10. The sliding track connector, as recited in claim 2, further including a post bore formed on said body configured to receive said post.

11. The sliding track connector, as recited in claim 9, further including a post bore formed on said body configured to receive said threaded connector.

12. The sliding track connector, as recited in claim 1, further including a twist tie.

13. A method for attaching an object to a track member, comprising the following steps:
 a. selecting a track member with an inner channel and an axial slot formed on one surface that communicates with said inner channel, said slot being surrounded by two flanges;
 b. selecting a sliding track connector that includes a body with a center cavity surrounded by four straight sidewalls or a single curved sidewall, a top surface, a flat bottom surface, and at least one pair of axially aligned holes formed on the sidewalls or sidewall on opposite sides of the body, a cap located below the body configured to slide along the inner channel formed inside the track member, and means for selectively pressing the cap against the flanges on opposite sides of the slot thereby attaching the body in a fixed position on said track member, and a post extending between said body and said cap, said post configured to slide along said slot;

c. inserting said cap into said inner channel and sliding said body to a desired location over said track member;

d. tightening said cap against said flanges of said track member on opposite sides of said slot to affix said body to said track member;

e. selecting a twist tie; and f. extending said twist tie through said holes formed on said body and around an object located adjacent to said body, said twist tie being sufficient in length so that ends of said twist tie may extend over said top surface of said body and said object and twisted together to hold said object over said body.

* * * * *